(12) United States Patent
Chang

(10) Patent No.: US 6,757,721 B2
(45) Date of Patent: Jun. 29, 2004

(54) METHOD OF MULTIPLE CONFIGURATION SETTING AND BACKUP EDITING OF A NETWORK APPARATUS

(75) Inventor: Chin-Long Chang, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 766 days.

(21) Appl. No.: 09/726,399

(22) Filed: Dec. 1, 2000

(65) Prior Publication Data

US 2002/0069268 A1 Jun. 6, 2002

(51) Int. Cl.[7] .............................................. G06F 13/00
(52) U.S. Cl. ...................................... 709/220; 709/226
(58) Field of Search ................................. 709/200, 201, 709/215, 216, 220, 221, 223, 224, 226

(56) References Cited

U.S. PATENT DOCUMENTS 6,378,021 B1 * 4/2002 Okazawa et al. ........... 710/317
6,412,080 B1 * 6/2002 Fleming et al. ............... 714/15
6,557,169 B1 * 4/2003 Erpeldinger ................ 717/173
6,622,265 B1 * 9/2003 Gavin ......................... 714/38

* cited by examiner

Primary Examiner—Moustafa M. Meky
(74) Attorney, Agent, or Firm—Bacon & Thomas PLLC

(57) ABSTRACT

A method of multiple configuration setting and backup editing of a network apparatus includes the step of installing a none volatile memory in a network apparatus being connected to a console, the step of scheming the none volatile memory to become a group of multiple configuration sectors, the step of using the console to select one configuration sector of the none volatile memory as an active configuration sector, for enabling the network apparatus to use the configuration in the active configuration sector for normal running, and to assign the other configuration sectors of the none volatile memory as backup configuration sectors, the step of editing the configuration in one of the backup configuration sectors, and the step of converting the edited backup configuration sector into an active configuration sector and the original active configuration sector into a backup configuration sector.

4 Claims, 3 Drawing Sheets

METHOD OF MULTIPLE CONFIGURATION SETTING AND BACKUP EDITING OF A NETWORK APPARATUS

BACKGROUND OF THE INVENTION

1. Field of the Invention

The present invention relates to a method of multiple configuration setting and backup editing of a network apparatus and, more particularly, to such a method in which a none volatile memory is installed in the network apparatus and divided into multiple configuration sectors; one configuration sector is schemed to become an active configuration sector, for enabling the network apparatus to use the configuration in the active configuration sector for normal running, and the other configuration sectors are schemed to become backup configuration sectors; after editing the configuration in one backup configuration sector, the edited backup configuration sector is converted into an active configuration sector and the original active configuration sector is converted into a backup configuration sector.

2. Description of the Prior Art

In an Ethernet, as illustrated in FIG. 1, terminals A, B, C and D of different Ethernet segments 11, 12, 13 and 14 are connected to different ports 1, 2, 3 and 4 of at least one network apparatus, such as hub, switch or router 30 to achieve linking for exchanging data. A network apparatus 30 for this purpose can have multiple ports. Apparatus having same DPDUs (bridge protocol data units) for use in Ethernet, either formed of a single device or a rack of devices are the so-call network apparatus of the present invention.

Currently, intelligent network apparatus provide a particular function for enabling the network manager to set a configuration subject to the actual linking condition of the network apparatus or users' requirements. However, the none volatile memory of these intelligent network apparatus is designed for storing one configuration only. When wishing to back-up or edit the configuration, as shown in FIG.2, the network manager must edit or modify the configuration through the console 50 or browser of the network apparatus 30 and then store the edited or modified configuration back to none volatile memory. Because the network apparatus 30 does not provide the configuration backup or edit function, any change of the set values of the configuration will immediately affect normal operation of the network apparatus when the network manager doing the editing or modifying work.

Further, if the network manager wishes to back-up the configuration of the network apparatus periodically due to network management requirements, an additional server 40 and the related software must be installed in the network apparatus 30 for linking to the network, as shown in FIG. 2, so that when the network manager gives a backup instruction through the software set in the console 50, the network apparatus 30 is driven to send the configuration to the server 40 through a network card 31, and to make a backup of the configuration in the server 40. Without the server 40, the configuration backup action cannot be achieved.

Further, If the network apparatus 30 encounters a problem or fails and the network manager wishes to maintain or repair the network apparatus 30, the network manager must download the configuration through the server 40 and then install the configuration back in the network apparatus 30, for enabling the network apparatus 30 to work continuously. This maintenance procedure is complicated and time-consuming. More particularly, if the trouble of the network apparatus 30 extends to the network card 31, or causes the network card 31 unable to link to the server 40, the network manager will not be able to download the backup of the original configuration. In this case, the maintenance work becomes more complicated. In case the network apparatus must be switched between multiple configurations to provide different network operation environments to fit different linking conditions and different user requirements, the procedure of changing the configurations is also complicated.

SUMMARY OF THE INVENTION

The present invention has been accomplished to provide a method of multiple configuration setting and backup editing of a network apparatus, which eliminates the aforesaid drawbacks. According to the present invention, a none volatile memory is installed in a network apparatus being connected to a console. The none volatile memory is then schemed to become a group of multiple configuration sectors, and one of the configuration sectors of the none volatile memory is assigned as an active configuration sector, for enabling the network apparatus to use the configuration in the active configuration sector for normal running, while the other configuration sectors assigned as backup configuration sectors. After editing of the configuration in one of the backup configuration sectors, the edited backup configuration sector into an active configuration sector is converted into an active configuration sector, and then the original active configuration sector is converted into a backup configuration sector.

DETAILED DESCRIPTION OF THE PREFERRED EMBODIMENT

Figure 1:
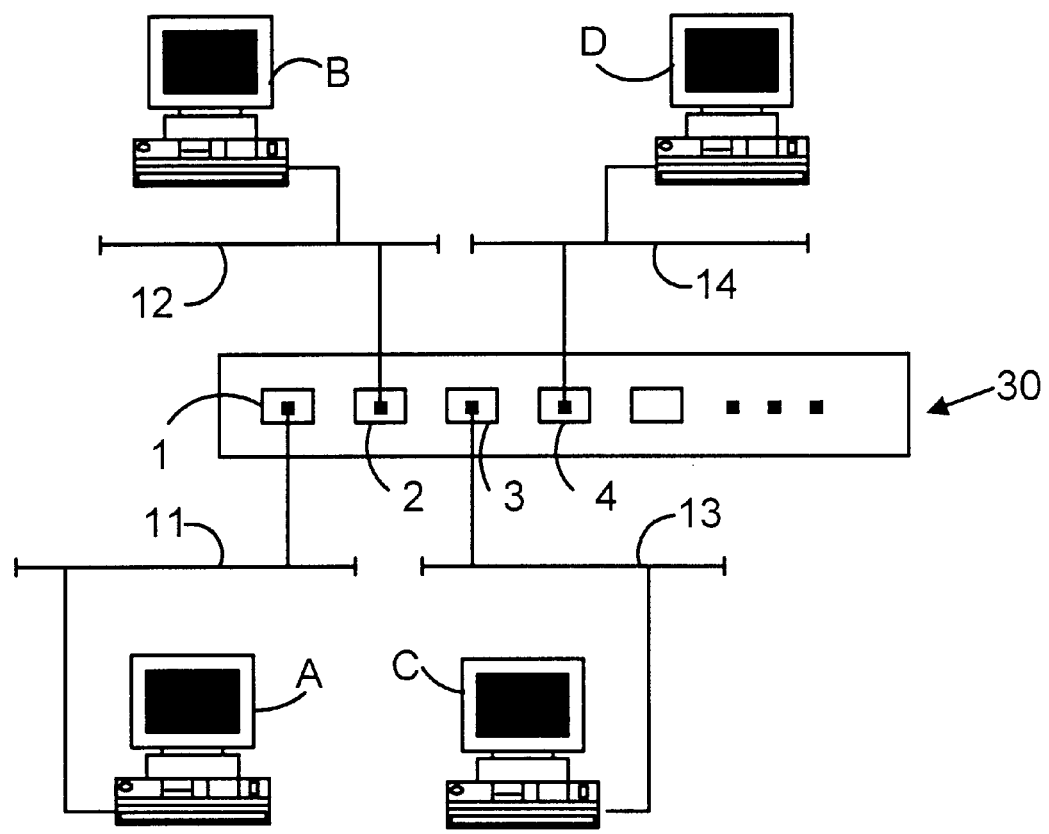
FIG. 1 illustrates terminals at different Ethernet segments linked to a network apparatus.
Figure 2:
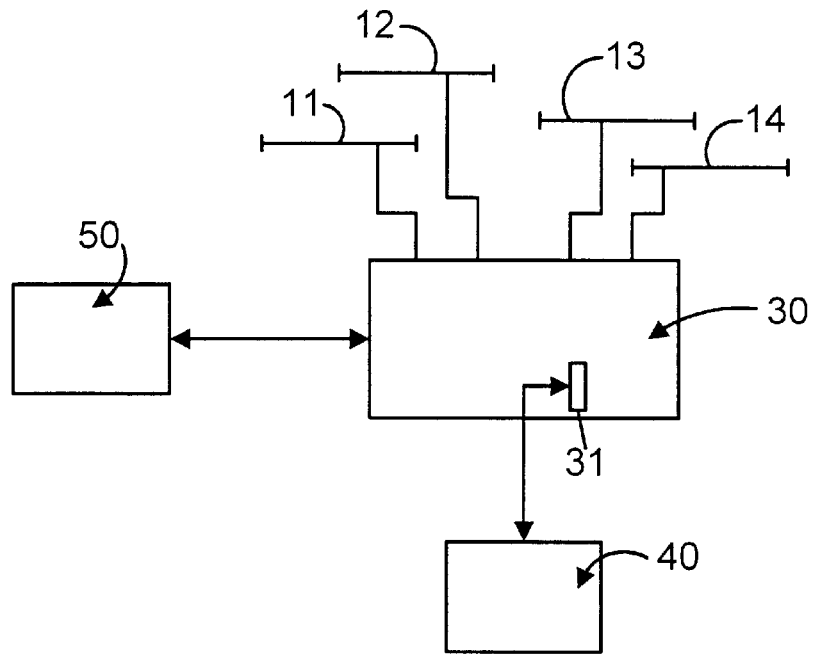
FIG. 2 illustrates the connection of a console and a server to a network apparatus in an Ethernet.
Figure 3:
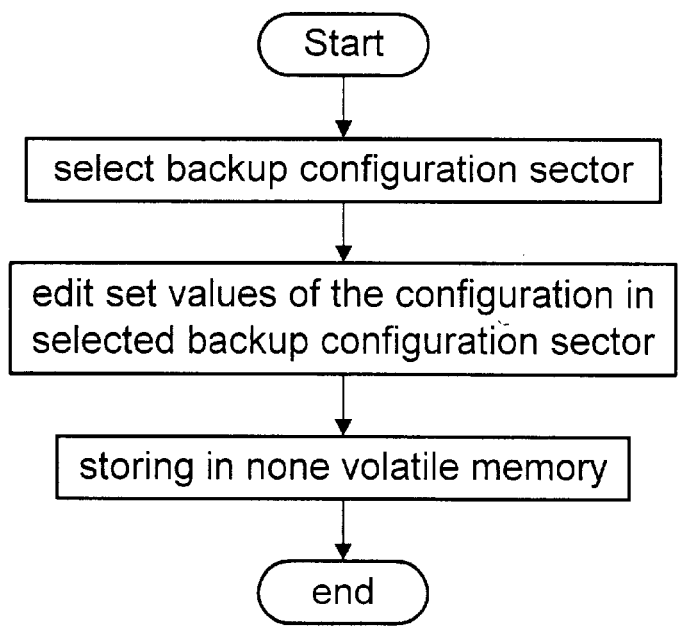
FIG. 3 is a flow chart of the present invention.
Figure 4:
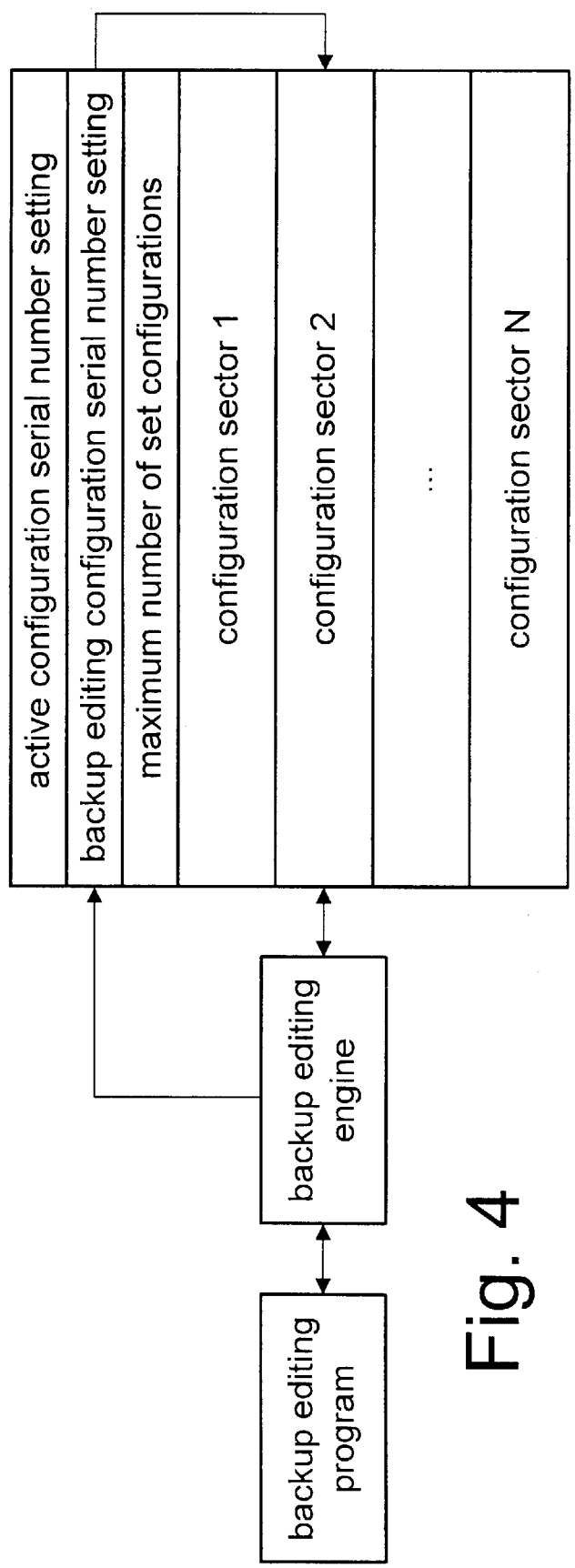
FIG. 4 illustrates the configuration sector architecture of a none volatile memory arranged according to the present invention.

Referring to FIG. 3, the method of the present invention is to install a none volatile memory in a network apparatus being linked to a console, which has a backup-editing program installed therein. As illustrated in FIG. 4, the backup editing program enables the network manager to use a backup edit engine in the console to scheme the none volatile memory to become a group of multiple configuration sectors, for example, the first configuration sector, the second configuration sector, . . . and the n-th configuration sector, so that the network manager can use the backup editing engine to select one configuration sector as the active configuration sector when editing the configurations of the network apparatus, enabling the network apparatus to use the configuration in the active configuration sector for normal running. The backup engine schemes the other configuration sectors to become backup configuration sectors, and to edit the configuration stored in the backup configuration sector selected by the network manager.

Referring to FIG. 4 again, after editing of the configuration values stored in the assigned backup configuration sector, the backup editing engine immediately converts the backup configuration sector into an active configuration sector, and automatically converts the original active configuration sector into a backup configuration sector, enabling the network apparatus to use the edited configuration for normal running continuously.

According to the method of the present invention, the network manager needs not to install an addition server, and can directly use the backup editing program in the console to make a backup for each configuration subject to the actual linking status of the network apparatus or actual user requirements, and to store the respective backups in the respective backup configuration sectors. If the network apparatus encounters a problem or fails to function well, the network manger can immediately use the backup-editing engine to convert one backup configuration sector into an active configuration sector for enabling the network apparatus to work continuously, and then to correct the errors of the network apparatus. According to the method of the present invention, the network apparatus maintenance work is simple, and the execution of the maintenance work does not affect normal operation of the network apparatus. Therefore, the present invention simplifies network apparatus management. Further, when wishing to switch or adjust a particular configuration of the stored configurations to provide a different network operation environment subject to a different linking condition or user requirement, the network manager simply uses the backup editing engine to convert the desired backup configuration sector into an active configuration sector, and then to change the settings of the respective configuration as desired. This method greatly reduces the burden of the network manager in changing and maintaining multiple configurations.

While only one embodiment of the present invention has been shown and described, it will be understood that various modifications and changes could be made thereunto without departing from the spirit and scope of the invention disclosed.

What the invention claimed is:

1. A method of multiple configuration setting and backup editing of a network apparatus comprising the step of:

(a) installing a none volatile memory in a network apparatus being connected to a console;

(b) scheming said none volatile memory to become a group of multiple configuration sectors;

(c) using said console to select one configuration sector of said none volatile memory as an active configuration sector, for enabling said network apparatus to use the configuration in said active configuration sector for normal running, and to assign the other configuration sectors of said none volatile memory as backup configuration sectors;

(d) editing the configuration stored in one of said backup configuration sectors; and (e) converting the edited backup configuration sector into an active configuration sector and the original active configuration sector into a backup configuration sector.

2. The method of claim 1 further comprising the step of making a backup of each of multiple configurations and storing the backups of said multiple configurations in said configuration sectors respectively.

3. The method of claim 1 further comprising the step of installing a backup editing program having a backup editing engine adapted to scheme said none volatile memory to become a group of configuration sectors, and to selectively set one of said configuration sectors as an active configuration sector, for enabling said network apparatus to use the configuration in said active configuration sector for normal running.

4. The method of claim 3 further comprising the step of using said backup editing engine to set the other configuration sectors as backup configuration sectors after one of the configuration sectors of said none volatile memory had been set by said backup editing engine as an active configuration sector, and then to edit the configuration in one of said backup configuration sectors, and then to convert the edited configuration sector into an active configuration sector after completion of the editing, and then to convert the original active configuration sector into a backup configuration sector, for enabling said network apparatus to use the edited configuration for normal running.

* * * * *